(12) United States Patent
Craft et al.

(10) Patent No.: US 7,650,491 B2
(45) Date of Patent: Jan. 19, 2010

(54) METHOD AND SYSTEM FOR CONTROLLED DISTRIBUTION OF APPLICATION CODE AND CONTENT DATA WITHIN A COMPUTER NETWORK

(75) Inventors: David John Craft, Austin, TX (US);
Pradeep K. Dubey, New Delhi (IN);
Harm Peter Hofstee, Austin, TX (US);
James Allan Kahle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/325,192

(22) Filed: Nov. 29, 2008

(65) Prior Publication Data
US 2009/0083542 A1 Mar. 26, 2009

Related U.S. Application Data

(62) Division of application No. 09/833,342, filed on Apr. 12, 2001.

(51) Int. Cl.
*H04L 9/00* (2006.01)
*G06F 13/00* (2006.01)

(52) U.S. Cl. .................. 713/150; 713/189; 709/217; 709/219

(58) Field of Classification Search .................. None
See application file for complete search history.

(56) References Cited

U.S. PATENT DOCUMENTS

| | | | |
|---|---|---|---|
| 5,708,709 A | | 1/1998 | Rose |
| 5,802,284 A | * | 9/1998 | Karlton et al. .............. 715/718 |
| 5,848,246 A | * | 12/1998 | Gish .......................... 709/228 |
| 5,875,327 A | * | 2/1999 | Brandt et al. ................ 713/1 |

(Continued)

FOREIGN PATENT DOCUMENTS

JP 06-103425 4/1994

(Continued)

OTHER PUBLICATIONS

Intellectual Property Office—Patents Index (CTPI) in English—Published Serial No. 389016—Web pages—2 pp, printed: Feb. 1, 2007.

(Continued)

*Primary Examiner*—Ponnoreay Pich
(74) *Attorney, Agent, or Firm*—Libby Z. Handelsman; Jack V. Musgrove (57) ABSTRACT

A secure communication methodology is presented. The client device is configured to download application code and/or content data from a server operated by a service provider. Embedded within the client is a client private key, a client serial number, and a copy of a server public key. The client forms a request, which includes the client serial number, encrypts the request with the server public key, and sends the download request to the server. The server decrypts the request with the server's private key and authenticates the client. The received client serial number is used to search for a client public key that corresponds to the embedded client private key. The server encrypts its response, which includes the requested information, with the client public key of the requesting client, and only the private key in the requesting client can be used to decrypt the information downloaded from the server.

3 Claims, 7 Drawing Sheets

U.S. PATENT DOCUMENTS

| | | | |
|---|---|---|---|
| 5,913,033 A * | 6/1999 | Grout | 709/219 |
| 5,920,696 A * | 7/1999 | Brandt et al. | 709/218 |
| 5,960,086 A | 9/1999 | Atalla | |
| 5,970,147 A | 10/1999 | Davis | |
| 6,084,969 A | 7/2000 | Wright et al. | |
| 6,085,320 A | 7/2000 | Kaliski, Jr. | |
| 6,327,595 B1 | 12/2001 | Lyson et al. | |
| 6,381,741 B1 | 4/2002 | Shaw | |
| 6,574,729 B1 | 6/2003 | Fink et al. | |
| 6,694,025 B1 | 2/2004 | Epstein et al. | |
| 6,748,530 B1 | 6/2004 | Aoki | |
| 6,766,353 B1 | 7/2004 | Lin et al. | |
| 6,895,501 B1 | 5/2005 | Salowey | |
| 6,925,182 B1 | 8/2005 | Epstein | |
| 6,975,727 B1 | 12/2005 | Vandergeest | |
| 7,039,810 B1 | 5/2006 | Nichols | |
| 7,305,545 B2 | 12/2007 | Filipi-Martin | |
| 2001/0039565 A1 | 11/2001 | Gupta | |
| 2001/0055395 A1 | 12/2001 | Vogler | |
| 2002/0059399 A1 * | 5/2002 | Learmonth | 709/219 |
| 2002/0076042 A1 | 6/2002 | Sandhu et al. | |
| 2002/0078344 A1 | 6/2002 | Sandhu et al. | |
| 2002/0126850 A1 | 9/2002 | Allen et al. | |

FOREIGN PATENT DOCUMENTS

| | | |
|---|---|---|
| JP | 06-112937 | 4/1994 |
| JP | 06-276188 | 9/1994 |
| JP | 07-219762 | 8/1995 |
| JP | 08-278750 | 10/1996 |
| JP | 11-282667 | 10/1999 |
| JP | 2000-059354 | 2/2000 |
| JP | 2001-230770 | 8/2001 |
| JP | 2002-140236 | 5/2002 |

OTHER PUBLICATIONS

Delphion—INPADOC Record—"TW0389016B: Encryption Device for Communication System and Method Thereof"—Web pages—pp. 1-2.

Pages 1-3 retrieved on Feb. 7, 2006 from the Internet URL: http://www.cap-lore.com/Crypto/symRSA.html.

* cited by examiner

Prior Art

Figure 1A

Prior Art

METHOD AND SYSTEM FOR CONTROLLED DISTRIBUTION OF APPLICATION CODE AND CONTENT DATA WITHIN A COMPUTER NETWORK

CROSS-REFERENCE TO RELATED APPLICATION

This application is a divisional of copending U.S. patent application Ser. No. 09/833,342 filed Apr. 12, 2001.

BACKGROUND OF THE INVENTION

1. Field of the Invention

The present invention relates to an improved data processing system and, in particular, to a method and apparatus for multicomputer data transfers. Still more particularly, the present invention provides a method and apparatus for secure computer-to-computer communication.

2. Description of the Related Art

Consumers have become accustomed to buying and using many independent electronic devices with each device having a specialized purpose. In general, the construction of each class of device is tailored to the technical requirements for accomplishing the intended purpose of the device and various economic considerations and tradeoffs with respect to its construction and its intended use. Hence, there has been little progress in the past towards consolidating many electronic devices into a single device with the computational facilities that would be required for many different purposes. Moreover, there has been little need to accomplish this type of consolidation.

For example, in the past, the quality of the video display that has been available for presenting output from different classes of devices has varied greatly. For obvious historical reasons, game consoles typically attach to standard television sets because most households did own a television set but did not own a computer monitor, so the household television set provided the only available display device to which the game console could be attached. The household television set has been an adequate display device for many years because the graphics generated by the game console would not have appeared any better on a display device with higher resolution. Meanwhile, personal computers and workstations have had monitors with much higher resolution and image quality because their uses required better monitors and their economic considerations justified better monitors.

While display devices can be used for purposes for which the device was not originally unintended, the results are generally poor. For example, web browsing is an inferior experience when Web pages are displayed on a standard television screen rather than on a computer monitor, even compared to a small computer monitor. The inferior viewing quality accounts for much of the lack of success of WebTV® and other similar offerings. Hence, in general, not only has there has been little ability to interface consumer electronic devices that were not originally constructed for doing so, but most consumer electronic devices also lacked the functionality that might be useful for doing so.

However, technology has advanced to the point at which particular computational requirements for mass-market consumer entertainment devices far exceed the requirements of personal computers, and in some cases, even exceed the computational facilities available from professional workstations. For example, specialized graphic processing requirements for game consoles now exceed those required or even provided by personal computers. As semiconductor technology reaches a state at which consumer electronic devices can be economically provided with many desired characteristics, many consumer electronic devices will contain functionality with a quality that is comparable to similar functionality in other devices. For example, in the near future, the quality differences between different classes of display device will disappear and actually reverse with the advent of high-definition television (HDTV) receivers, which have greater resolution and image quality than computer monitors, including the majority of graphic workstation displays.

In addition, game consoles will contain graphic processing capabilities that exceed those of personal computers. Hence, there will be increasing consumer demand for using game-console-like devices and HDTV receivers in combination for some of the purposes that are now delegated to personal computers. Although some consumers may have significant investments in legacy software such that they would not want to replace both computer hardware and computer software just to obtain the advantages of a game-console-like device and an HDTV-quality display, the performance capabilities of game-console-like devices will permit software emulation of various computer processors, and the emulation will be more than sufficient to run common business applications.

Although HDTV receivers are relatively new and expensive, game-console-like devices and HDTV systems will both realize significant cost advantages from manufacturing economies of scale when they are more widely deployed. The sales volume of workstation and personal computer systems are dwarfed by those associated with televisions and game consoles, so considerably lower hardware manufacturing costs are expected to result. More importantly, because game-console-like devices will be able to be manufactured relatively inexpensive, they can be marketed in a manner similar to the sales model for razors in which the sales of disposable razor blades are much larger than the sales of relatively durable razors. In the case of game-console-like devices, there may be little profit or possibly a small loss in selling the console device, but profits can be generated from subsequent high margin sales of games, content, or other software. In contrast, the manufacturers of workstations or personal computer systems must make a profit only from the sale of hardware systems and peripherals.

Given all of the above considerations, it is considered extremely likely by many industry experts that an advanced game-console-like device, together with a high quality display device and a broadband network connection, will eventually displace many electronic devices, such as the personal computer and the video cassette recorder, including more recent electronic devices, such as the set-top box and the digital video recorder. In addition to providing extremely realistic and detailed individual and multi-player video games, an advanced game-console-like device will provide a variety of traditional computer applications, such as Web browsing, e-mail, or word processing, as well as more advanced applications, such as downloading and playing movies and audio content, e-commerce, Internet-based telephony, distance education, and other applications.

In addition to these emerging technological developments, another significant emerging development is the proliferation of the "pay-per-use" business model; a user of a client system downloads application code and audiovisual content as needed and pays for specific limited uses. This business model allows software application providers to ensure that the latest version of code is always employed, thereby reducing interoperability problems and improving the quality of service since all problems can be fixed at the source of the code. Additionally, a more predictable revenue stream also results in conjunction with reduced costs for individuals. For example, with a complex business software application suite, individual users will be able to purchase some of the suite's capabilities, which contrasts with the current practice of purchasing the entire suite but only using a small fraction of it. A similar argument applies to digital music content for which a consumer might wish to pay to download only a few songs from an artist rather than purchasing an entire collection of songs.

In combination, these considerations point to a consumer electronic device market with widespread deployment of large numbers of computationally high-performance entertainment devices using HDTV systems for graphic display. These consumer systems will be connected to content servers via broadband links in a client/server configuration. The user interface may use wireless input devices, such as a wireless keyboard, mouse and/or joystick, in addition to cordless telephone handsets and remote controls, although conventional computer peripherals might also be attached. Most importantly, though, it is expected that most if not all application code and content will be purchased and downloaded on demand using a pay-per-use or subscription-based business model.

Given this type of computational environment, there is an important need to maintain control over downloaded application code and content and to ensure security of the communications between client devices and servers. Given the considerable value of such content, it is necessary to ensure that a particular client system can be authenticated and then authorized to receive any requested content while being properly charged for its use. The security of e-commerce, other financial transactions, and general communications between a client and a server must also be ensured.

Therefore, it would be advantageous to have a system and a methodology for preventing the circumvention of content control mechanisms while also verifying the authenticity of downloaded code in a manner that ensures that the code does not include viruses or other malicious code. It would be particularly advantageous to ensure that the client may not use downloaded content in an inappropriate fashion that diverts revenue from the service provider, such as illegitimate copying of executable application code or audiovisual content in a playable form.

SUMMARY OF THE INVENTION

A method, a system, an apparatus, and a computer program product are presented for secure communication between a client and server. The client device is configured to download application code and/or content data from a server operated by a service provider. Embedded or fixed within a client's processor chip is a client private key, a unique client serial number, and a copy of a server public key. The client forms a request message, which includes the client serial number, encrypts the request with the server public key, and sends the download request to the server. The server decrypts the request message with a server private key and authenticates the client device. The client serial number in the received request is used to search for a client public key that corresponds to the client private key embedded in the client. Prior to downloading the requested information, the server encrypts the information with the client public key of the requesting client, and only the private key in the requesting client's processor chip can be used to decrypt the information downloaded from the server.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DESCRIPTION OF THE PREFERRED EMBODIMENT(S)

The present invention is directed to a system and a methodology for controlling the distribution of application code and content data within a data processing system. As background, a typical organization of hardware and software components within a distributed data processing system is described prior to describing the present invention in more detail.

Figure 1A:
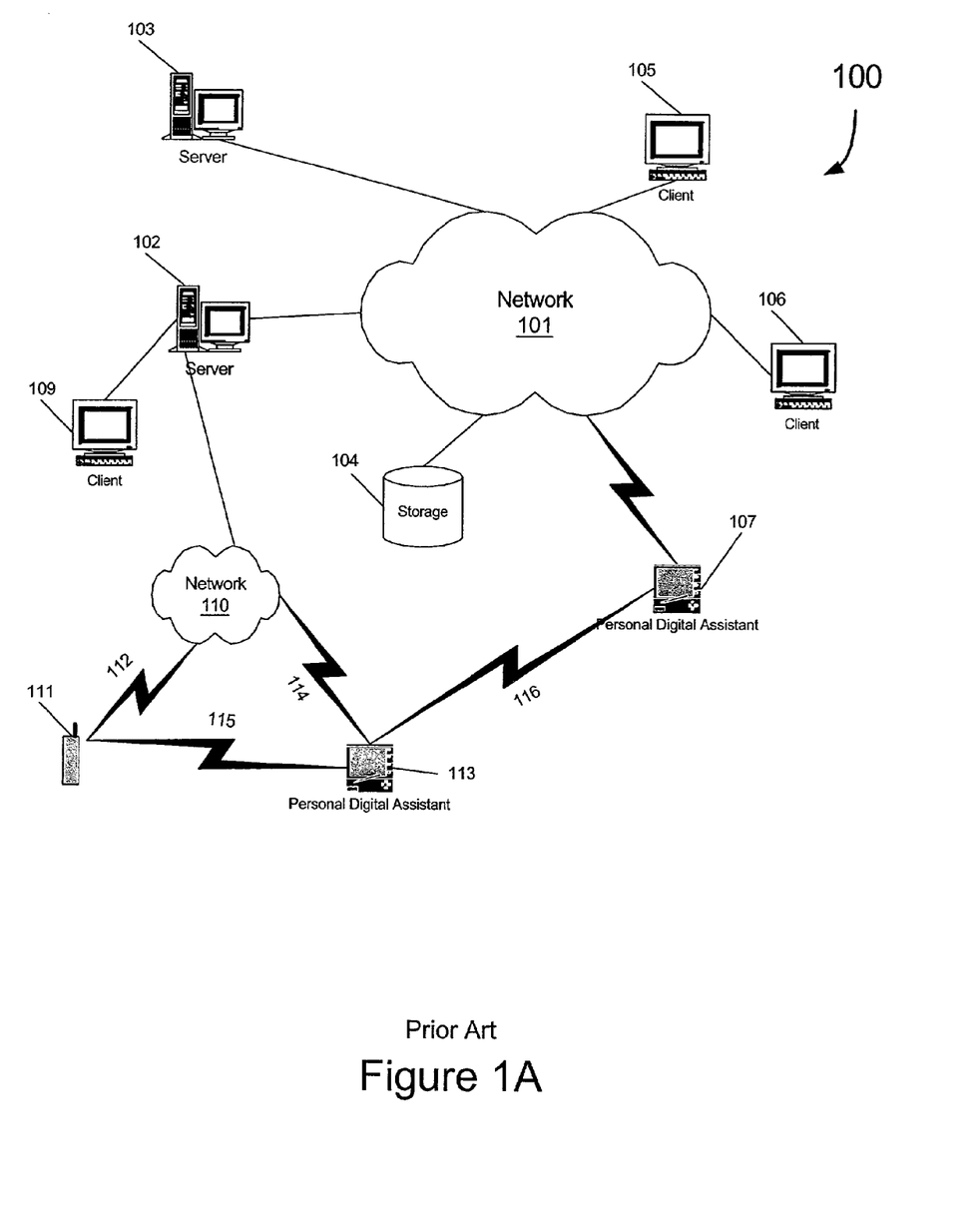
FIG. 1A depicts a typical distributed data processing system in which the present invention may be implemented.

With reference now to the figures, FIG. 1A depicts a typical network of data processing systems, each of which may contain and/or operate the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
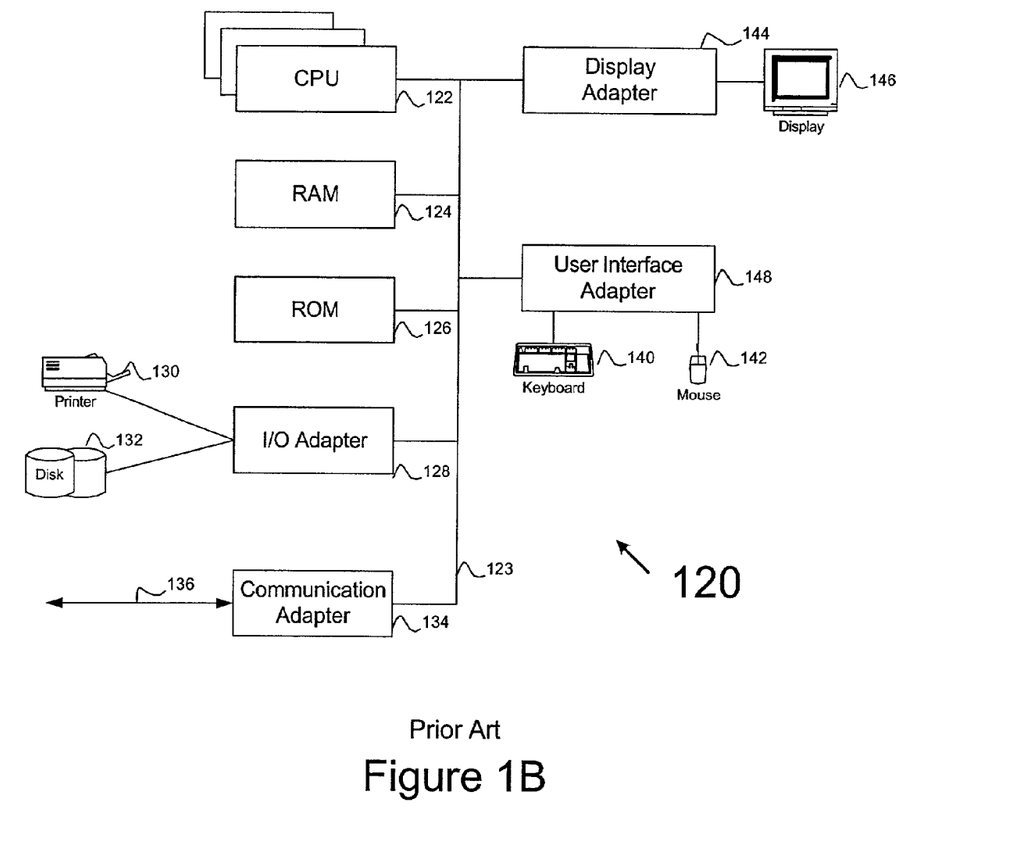
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, including a digital signal processor (DSP) and other types of special purpose processors, and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to a system and a methodology for controlling the distribution of application code and content data within a data processing system. To accomplish this goal, the present invention uses cryptographic keys in novel ways for authentication and authorization processes. Before describing the present invention in more detail, though, some background information about public key cryptography is provided for evaluating the operational efficiencies and other advantages of the present invention.

Public key cryptography requires each party involved in a communication or transaction to have a pair of keys, called the public key and the private key. Each party's public key can be published or provided to another party while the private key is kept secret. Public keys are numbers associated with a particular entity and are intended to be known to everyone who needs to have trusted interactions with that entity. Private keys are numbers that are supposed to be known only to a particular entity, i.e. kept secret. In a typical public key cryptographic system, a private key corresponds to exactly one public key.

Within a public key cryptography system, since all communications involve only public keys and no private key is ever transmitted or shared, confidential messages can be generated using only public information and can be decrypted using only a private key that is in the sole possession of the intended recipient. Furthermore, public key cryptography can be used for authentication, i.e., digital signatures, as well as for privacy, i.e., encryption.

Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message can be confident of the identity of the sender and/or the integrity of the message.

For example, when a sender encrypts a message, the public key of the receiver is used to transform the data within the original message into the contents of the encrypted message. A sender uses a public key to encrypt data, and the receiver uses a private key to decrypt the encrypted message.

When authenticating data, data can be signed by computing a digital signature from the data and the private key of the signer. Once the data is digitally signed, it can be stored with the identity of the signer and the signature that proves that the data originated from the signer. A signer uses a private key to sign data, and a receiver uses the public key to verify the signature.

As mentioned above, the present invention is directed to a system and a methodology for controlling the distribution of application code and content data within a distributed data processing system. To accomplish this goal, the present invention uses a system architecture and a set of processes as described in more detail with respect to the remaining figures.

Figure 2:
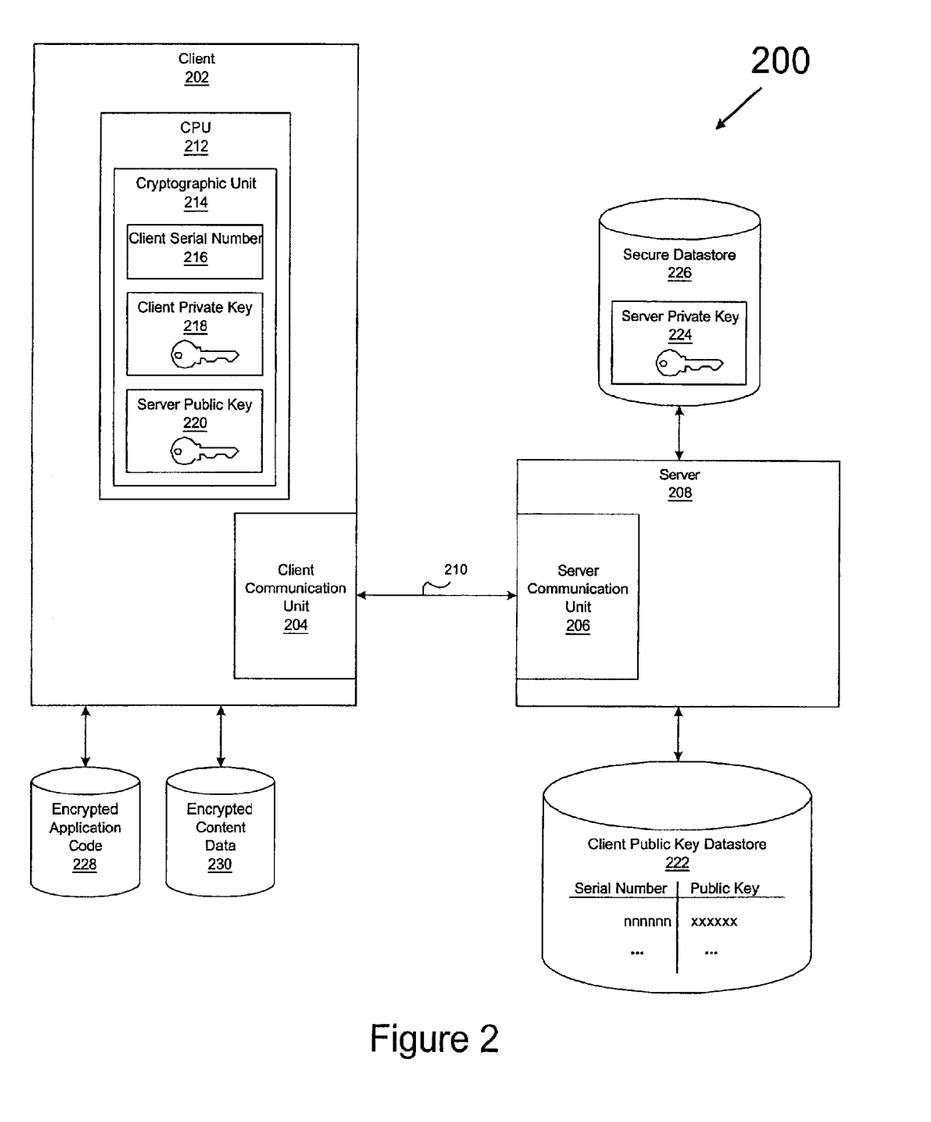
FIG. 2 is a block diagram depicting a data processing system for secure communication of application code and content using permanent, hardware-embedded, cryptographic keys in accordance with a preferred embodiment of the present invention.

With reference now to FIG. 2, a block diagram depicts a data processing system for secure communication of application code and content using permanent, hardware-embedded, cryptographic keys in accordance with a preferred embodiment of the present invention. In system 200, client 202 uses client communication unit 204 in order to communicate with server communication unit 206 of server 208 via communication link 210. In addition to using well-known or proprietary network communication protocols, it should also be noted that client 202 and server 208 may communicate using appropriate protocols to exchange request messages and response messages to establish any necessary application sessions between the client and the server. For example, as explained in more detail further below, client 202 may download secure application code and content data from server 208 using any appropriate protocol and message formats.

Distributed data processing system 200 shown in FIG. 2 is similar to system 100 shown in FIG. 1A, and client 202 and server 208 are similar to system 120 shown in FIG. 1B. System 200 may contain multiple clients 202 and multiple servers 208.

More importantly, though, as shown in FIG. 2, client 202 comprises client CPU 212 that itself comprises a special purpose processing unit or structure, i.e., cryptographic unit 214. Client CPU 212 comprises other standard processing units and structures, such as a cache, etc., not shown in the figure.

Client CPU 212 is a special-purpose, client-system, processor chip that belongs to a class of specially manufactured chips. These client system CPU chips are designed with cryptographic functionality so that they may optionally be used within a specific distributed data processing system for certain purposes, such as system 200, as explained in more detail below. After each client CPU chip has been manufactured and tested, each client CPU chip is assigned a unique client serial number and a unique client public/private key pair. The manufacturer of the client CPU chips also has knowledge of a server public key that is associated with a server private key that may or may not be known to the manufacturer.

Each client CPU chip has a cryptographic unit that has been manufactured to contain programmable memory storage. Prior to releasing a client CPU chip, the manufacturer permanently embeds or fixes the assigned client serial number, the assigned client private key, and the server public key into the CPU chip. As shown in FIG. 2, client CPU chip 212 contains cryptographic unit 214, which includes client serial number 216, client private key 218, and server public key 220. A variety of well-known methods are available for embedding binary data within semiconductor chips, such as blowing semiconductor fuses as is used in DRAM manufacturing.

The manufacturer of the client CPU chip may then destroy any existing copies of client private key 218, while client serial number 216 and the client public key corresponding to client private key 218 are associatively retained for subsequent use and deployment, such as storing them within the server's client public key datastore 222. Meanwhile, server private key 224 that corresponds to server public key 220 is securely stored, such as within secure datastore 226. If system 200 contains multiple servers 208, then each server that needs to communicate with client 202 will require access to server private key 224.

Client 202 uses its client CPU 212 to communicate with server 208 to request and download encrypted application code 228 and encrypted content data 230, as explained with respect to the processes depicting in the remaining figures and as explained in more detail below.

Figure 3:
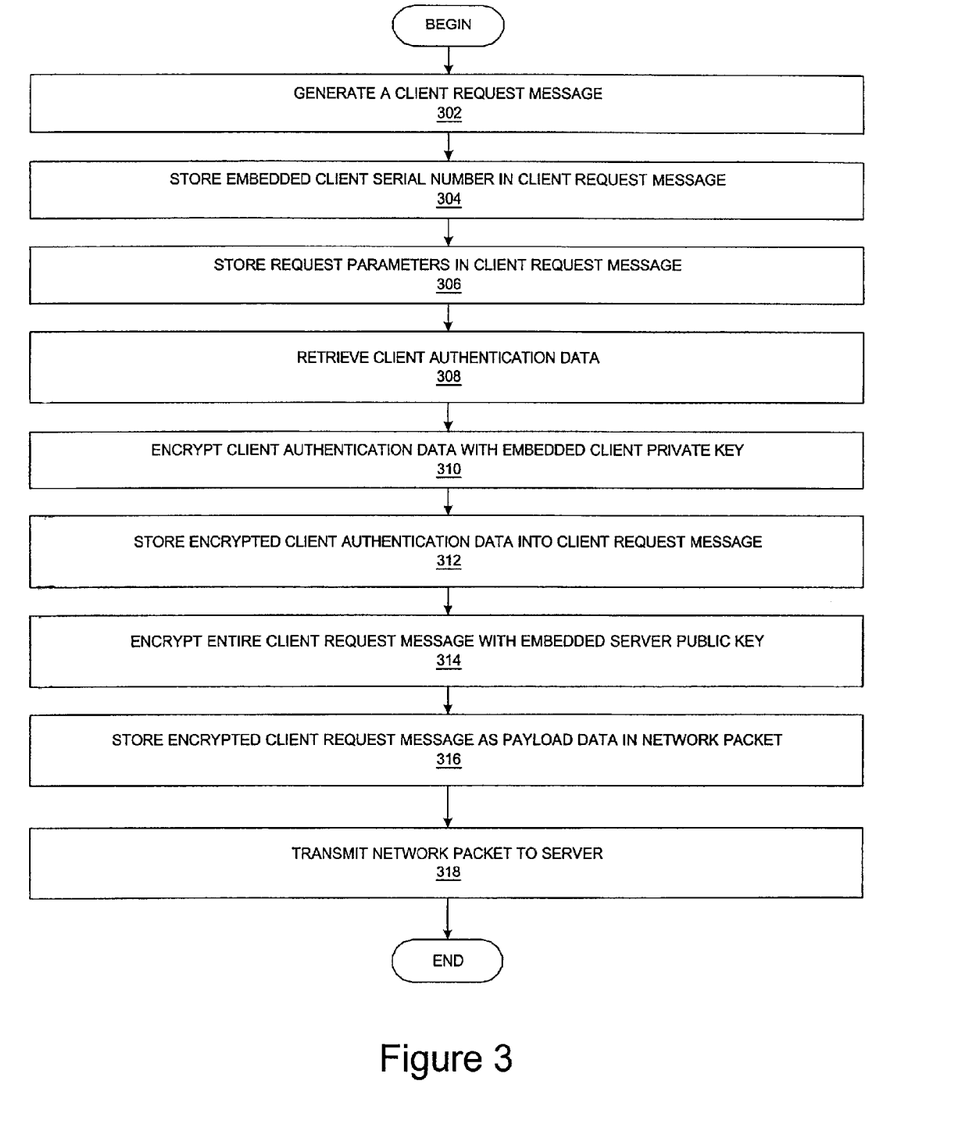
FIG. 3 is a flowchart depicting a process through which a client system containing a client CPU chip, as described with respect to FIG. 2, requests and obtains encrypted application code and encrypted content data in accordance with a preferred embodiment of the present invention.

With reference now to FIG. 3, a flowchart depicts a process through which a client system containing a client CPU chip, as described with respect to FIG. 2, requests encrypted application code and/or encrypted content data in accordance with a preferred embodiment of the present invention. The steps shown in FIG. 3 occur within the client CPU with the encryption and decryption steps occurring in a manner that protects the embedded client values from being revealed. In other words, in the preferred embodiment, all of the computational and memory resources for the cryptographic processes should be completely embedded as a self-contained unit within the client CPU chip, such as cryptographic unit 214 shown in FIG. 2.

In the flowchart shown in FIG. 3, an operator or user of a client system, such as client 202 in FIG. 2, is attempting to request secure application code and/or content data from a specific application service provider and/or a content service provider that operates a corresponding server, such as server 204 in FIG. 2. The user may have purchased the client device from the service provider, or alternatively, the manufacturer of the client device and the service provider are contractually bound such that purchasers of the client device are able to purchase service from the service provider. In any case, it is assumed that appropriate initialization, configuration, and financial processes or arrangements have been completely or are otherwise performed such that the server device of the service provider will provide code and/or content that interoperates in the expected manner with the client device of the user.

The process begins with the client generating a client request message to be sent to a server (step 302). The embedded client serial number is stored in the client request message (step 304), and any necessary request parameters for identifying the specific application or content or for qualifying the request in any manner is also stored within the client request message (step 306).

Client authentication data is then retrieved (step 308) and encrypted using the embedded client private key (step 310). The content of the client authentication data may vary depending on the implementation of the invention; preferably, it is a data item that is easily verifiable by the server. In a simplest case, the client authentication data might be another copy of the embedded client serial number, or for additional security, the client authentication data may include a user identifier to be associated with a valid account with the service provider. The encrypted client authentication data is then stored within the client request message (step 312).

The entire client request message is then encrypted with the embedded server public key (step 314), and the encrypted client request message is stored as payload data within an appropriate network packet (step 316). The network packet is then transmitted to the service provider's server (step 318), and the process of generating a client request is complete.

Figure 4:
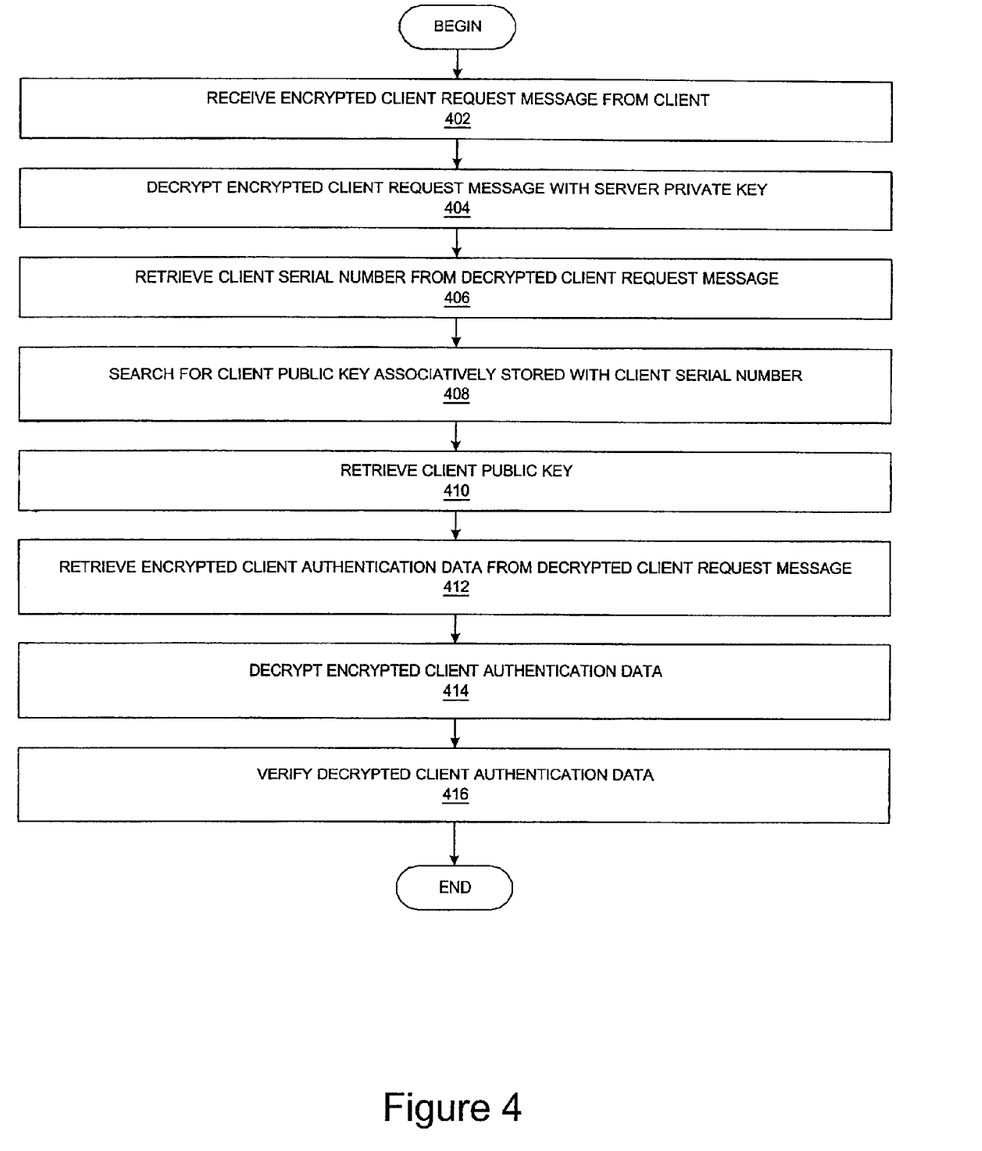
FIG. 4 is a flowchart depicting a process by which a server system with knowledge of the required server private key receives and authenticates a request for encrypted application code and/or encrypted content data from a client in accordance with a preferred embodiment of the present invention.

With reference now to FIG. 4, a flowchart depicts a process by which a server system with knowledge of the required server private key receives and authenticates a request for encrypted application code and/or encrypted content data from a client in accordance with a preferred embodiment of the present invention. The steps shown in FIGS. 4 and 5 occur within a data processing environment controlled by a service provider. While the steps are not necessarily all completed within a single server, it is assumed that the necessary precautions are made to protect the security of the server private key.

The process begins with a server receiving an encrypted client request message from the requesting client device (step 402). The encrypted client request message is unloaded from the network packet and decrypted using the server private key (step 404). The client serial number is then retrieved from the decrypted client request message (step 406) and used to search for an associated client public key (step 408) in the appropriate database or directory. Assuming the client public key is located, it is retrieved (step 410), and after retrieving the encrypted client authentication data from the decrypted client request message (step 412), the encrypted client authentication data is decrypted with the client public key (step 414). After verifying the client authentication data in the appropriate manner (step 416), the process of receiving and authenticating the client request message is complete, and the server may proceed with download processes in response to the request.

Figure 5:
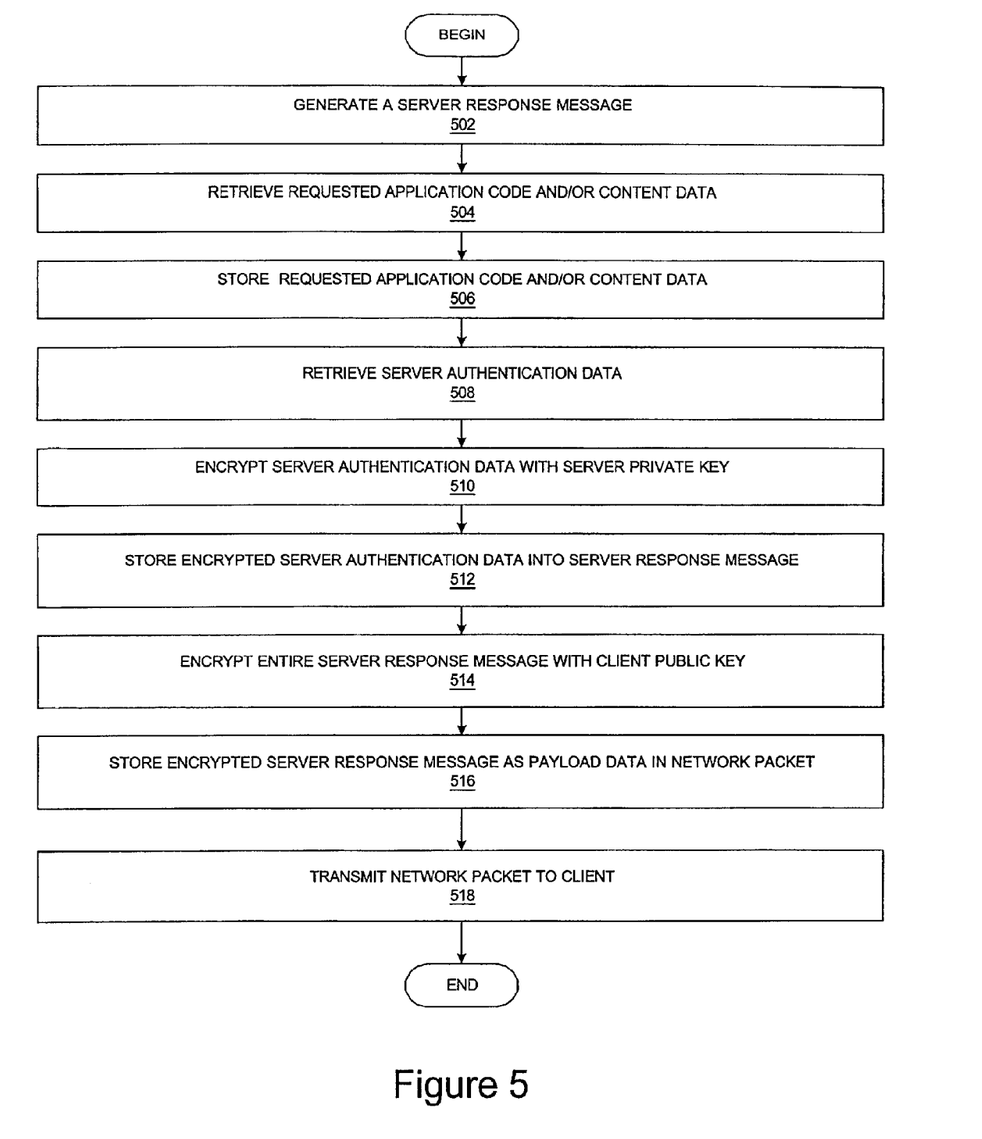
FIG. 5 is a flowchart depicting a process by which a server system with knowledge of the required server private key retrieves and transmits requested encrypted application code and/or encrypted content data to a client in accordance with a preferred embodiment of the present invention.

With reference now to FIG. 5, a flowchart depicts a process by which a server system with knowledge of the required server private key retrieves and transmits requested encrypted application code and/or encrypted content data to a client in accordance with a preferred embodiment of the present invention. The process begins with the server generating a server response message (step 502) and retrieving the application code and/or content data that was specifically requested by the client (step 504). The requested application code and/or content data is then stored within the server response message (step 506).

Server authentication data is then retrieved (step 508), encrypted using the server private key (step 510), and stored within the server response message (step 512). The content of the server authentication data may vary depending on the implementation of the invention; preferably, it is a data item that is easily verifiable by the client. In a simplest case, the server authentication data might be another copy of the embedded server public key, or for additional security, the server authentication data may include a user identifier associated with an account with the service provider.

The entire server response message is then encrypted with the client public key of the requesting client (step 514), and the encrypted server response message is then stored as payload data within an appropriate network packet (step 516). The network packet is then transmitted to the request client device (step 518), and the process of providing the requested information from the server provider is complete.

Figure 6:
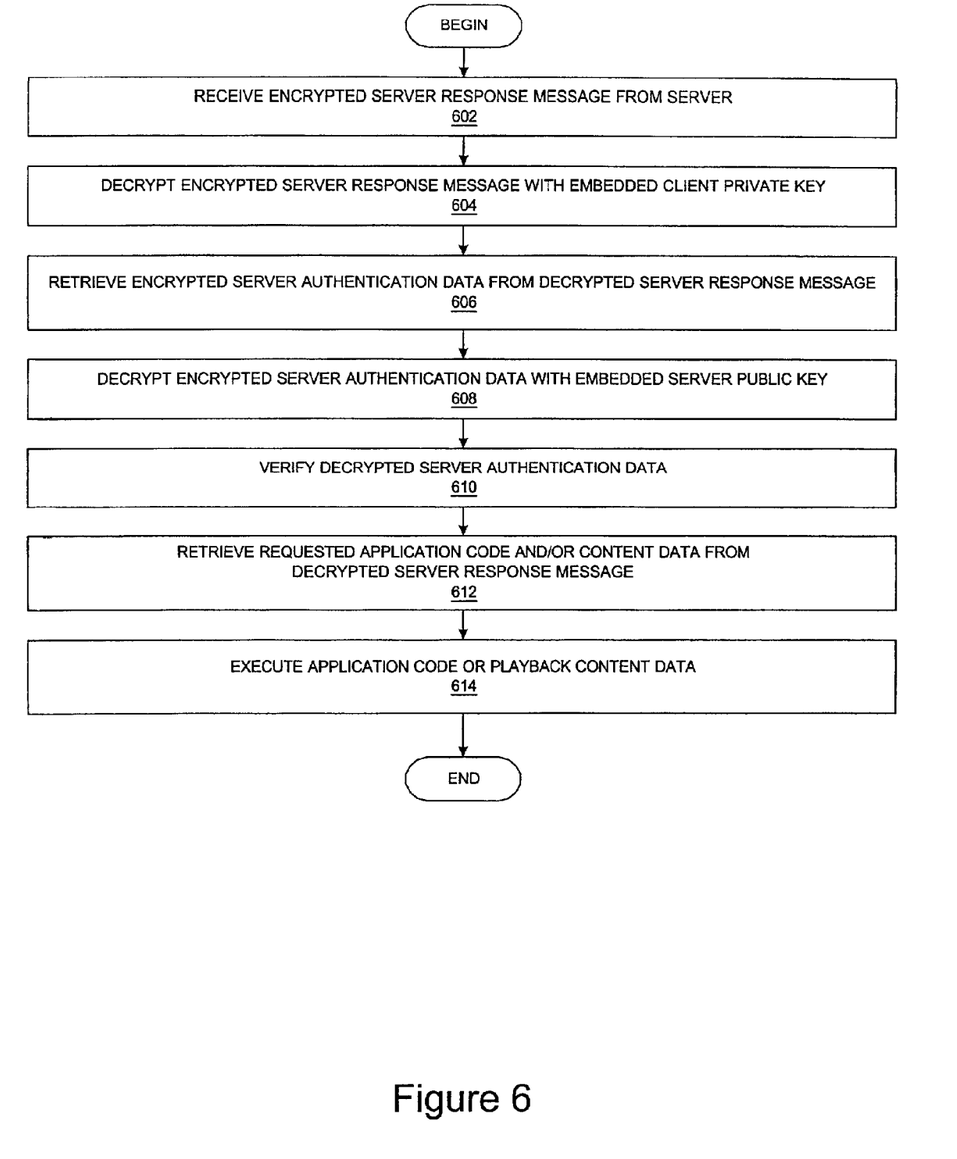
FIG. 6 is a flowchart depicting a process through which a client system receives requested encrypted application code and/or encrypted content data in accordance with a preferred embodiment of the present invention.

With reference now to FIG. 6, a flowchart depicts a process through which a client system receives requested encrypted application code and/or encrypted content data in accordance with a preferred embodiment of the present invention. Again, the steps shown in FIG. 6 occur within the client CPU with the encryption and decryption steps occurring in a manner that protects the embedded client values from being revealed. In other words, in the preferred embodiment, all of the computational and memory resources for the cryptographic processes should be embedded within the client CPU, preferably self-contained within a unit of the client CPU, such as cryptographic unit 214 shown in FIG. 2.

The process begins with the client receiving an encrypted server response message (step 602). The client decrypts the encrypted server response message with the embedded client private key (step 604). The encrypted server authentication data is then retrieved (step 606), decrypted with the embedded server public key (step 608), and verified in the appropriate manner (step 610). Assuming the authentication data is verified, the requested application code or content data is retrieved from the decrypted server response message (step 612), and the application code is then executed or the content data is presented in the appropriate manner by the client device (step 614). Alternatively, the application code or content data may be encrypted and stored in a secure manner for subsequent use. The process of receiving and using requested application code or content data is then complete.

If any of the encryption or decryption steps shown in FIGS. 3-6 fail, appropriate error measures may be taken. Assuming that the encryption or decryption steps should not fail because bit errors during transmission are handled or corrected by the communication units of the client and the server using the underlying transmission protocol, the client or server may generate error signals, error messages, error notifications, error logs, etc., as appropriate. Other actions may be taken as appropriate. For example, repeated failures to authenticate the client's requests may result in termination of service for the client device or the generation of a service call.

It is assumed that the architecture of the client CPU is arranged such that the embedded client serial number, the embedded client private key, and the embedded server public key cannot be read from the client CPU's cryptographic unit into any other unit of the CPU, thereby safeguarding the embedded values and ensuring that the downloaded encrypted application code or downloaded encrypted content data has value only to the client to which the server's response was directed. In other words, all of the computational and memory resources for the cryptographic processes should be embedded within the client processor chip, e.g., within cryptographic unit 214 shown in FIG. 2, such that no external information flows can be monitored by a malicious entity.

More importantly, it is assumed that the architecture of the client CPU is arranged such that the embedded values must be used by the cryptographic unit. In other words, the cryptographic unit is not able to use any other cryptographic key values other than the embedded values. Hence, an attacker cannot attempt to read the embedded values nor substitute other cryptographic key values. Otherwise, the attacker could attempt a "Trojan Horse" attack in the following manner. The attacker injects a false server public key into the client CPU that corresponds to a private key known to the attacker; if the client CPU were to receive an malicious code fragment from the attacker, it would appear to be a legitimate packet of encrypted application code because it would properly decrypt with the injected false public key. Subsequent execution of the malicious code might then be used to reveal the embedded client private key if the client CPU architecture were constructed to be able to do so, e.g., by loading the client private key into a general purpose register.

In a preferred embodiment, it is also assumed that the architecture of the client CPU prevents application code that has been downloaded from the service provider's server from gaining control of the client CPU if the downloaded application code cannot be authenticated in the manner described above. In other words, before the downloaded application code from the server is executed, it should be authenticated as originating from the trusted server. This ensures that the downloaded code truly originated from a trusted server, thereby ensuring that a malicious attack is not being made on the client device. While performing an authentication process on all application code that the client device believes has been downloaded from the trusted server may be time consuming, it is not necessary to execute a public key algorithm against all of the content and downloaded application code. For example, a small portion of the downloaded code could be authenticated using a public key algorithm while the remainder of the downloaded application code is checked using integrity checking algorithms that are less computationally expensive. Symmetric key classes of encryption algorithms are one example of such techniques; they require less computation for encryption/decryption but need a secure key exchange between the client and server before a communication session can begin. In order to do this type of verification, the application code that is authenticated using the server public key could comprise a small program that performs a download using symmetric keys; after the small program has been authenticated, it executes to download the remaining application code or content data.

The advantages of the present invention should be apparent in view of the detailed description of the invention that is provided above. By using a novel manner of storing and using cryptographic keys within a processor chip, the present invention allows secure control of downloaded application code and content. In addition, traditional security requirements can be provided, such as secure communications between client devices and servers, authentication and authorization between a client and a server, and secure e-commerce and other financial transactions.

More importantly, however, the circumvention of content control mechanisms can be prevented while also verifying the authenticity of downloaded code in a manner that ensures that the code does not include viruses or other malicious code. Embedded within a target client's processor chip is a client private key, a serial number, and one or more server public keys. Prior to the server downloading application code or content data to the client, the information is encrypted with the public key of the requesting client, and only the private key in the requesting client's processor chip can be used to decrypt the information downloaded from the server. Hence, even if the encrypted information is intercepted by a client with a similar processor chip, the downloaded information has no value to the intercepting client. Moreover, a copy of the server's public key can be used to verify the legitimacy of the downloaded information, thereby ensuring that any downloaded application code does not include viruses nor malicious code. In addition, an illegitimate copy of the downloaded information that is passed to another client system has no value. Multiple server public keys could be embedded for different purposes. For example, one of the server public keys could be used for Internet communication, while another server public key could be used for wireless communication. As another example, different server public keys could correspond to different service providers, or multiple server public keys could be stored as spares or backups if it is determined that a server private key has become compromised.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

In particular, it should be noted that it is not essential to transmit a serial number in order to identify the requesting client to a server. If each client has a unique public cryptographic key pair, this could be sent instead. The server would not then need to retain a database of client serial numbers and associated public cryptographic keys, as it obtains the needed public key directly from the client request message, once it has decrypted it. However, it does still need to maintain a list of registered public keys, and must ensure the received key is in such a list before proceeding. If this were not done, an attacker with knowledge of how the request and authentication data fields are constructed could simply generate a valid request using any arbitrary chosen pair of cryptographic keys. The use of a serial number also requires an attacker to obtain both this serial number and the corresponding public key in order to create a valid request. Although these keys are termed "public", this does not necessarily mean they are published, and preferable such keys would be held in secure storage at the server location of the service provider to whom the client is connected.

Finally, although the invention has been described in terms of a processor chip, it should be recognized that it can also reside in a Network Interface Card, or chip, or any other kind of interface processing device or system, and is not limited to a general-purpose processor. The TCPA subsystem chip referenced in the prior art is one example.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for secure communication between a client and a server in a data processing system, the method comprising:
   the client requesting information from the server;
   generating a first server message at the server, the first server message including application code encrypted with a server private key and authenticable with a server public key, wherein the application code includes a program that performs a download using symmetric keys;
   retrieving the information that was requested by the client;
   storing the retrieved information in a second server message encrypted with the symmetric keys;
   sending the first server message to the client;
   authenticating the first server message at the client using the server public key; and
   executing the program at the client to download the second server message from the server.

2. The method of claim 1, further comprising
   retrieving server authentication data;
   retrieving the server private key;
   encrypting the server authentication data with the server private key; and
   storing the encrypted server authentication data in the first server message.

3. A method for secure communication between a client and a server in a data processing system, the method comprising:
   receiving a first server message from the server at the client, the first server message including first application code encrypted with a server private key, wherein the first application code includes a program that performs a download using symmetric keys, wherein the first server message is received in response to a request for a second application code by the client;
   authenticating the first application code with a server public key; and
   executing the program at the client to download a second server message from the server, the second server message including the second application code requested by the client, wherein the first application code is small relative to the second application code.

* * * * *